UNITED STATES PATENT OFFICE.

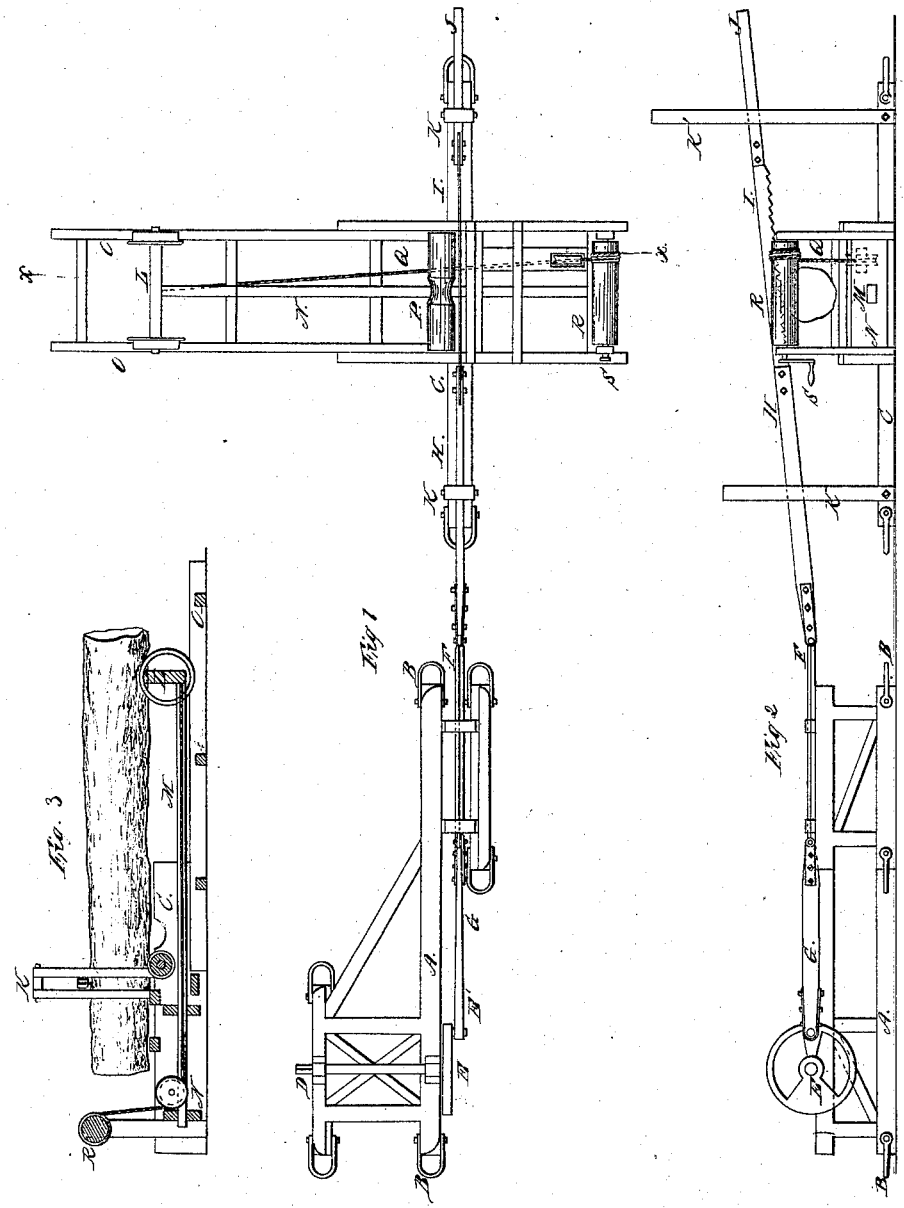

JOHN T. ARMSTRONG, OF JACKSONTOWN, OHIO.

CROSSCUT-SAWING MACHINE.

Specification of Letters Patent No. 21,177, dated August 17, 1858.

*To all whom it may concern:*

Be it known that I, JOHN T. ARMSTRONG, of Jacksontown, in the county of Licking and State of Ohio, have invented certain new and useful Improvements in Crosscut-Sawing Machines for Sawing Logs into Shingle-Bolts, Fence-Posts, Firewood, or other Purposes; and I do hereby declare that the following is a full and exact description of the same, reference being had to the accompanying drawings, and to the letters of reference marked thereon, in which—

Figure 1 is a plan view, Fig. 2 a side elevation, and Fig. 3 a vertical transverse section taken through the line $x$ $x$ Fig. 1.

The nature of my invention relates to certain new and useful combinations and arrangements of the parts of a cross-cut sawing machine for sawing logs into lengths, for shingle bolts, fence posts, fire wood and other purposes—made portable to be used in the wood, and to be shifted from place to place to the vicinity of the timber to be cut, if required—by which the efficiency of the machine is increased and its expense decreased.

A is the crank and guide frame, made of timber, and braced sufficiently to strengthen it to withstand the "racking" induced by the movement of the crank and saw. It is secured to the ground, when used in the open woods, by wooden stakes or iron pins driven into the ground through the eyes or clevises B, and to the floor—if used in a building—
by bolts running through the bottom timbers and through the floor or floor timbers.

C is the carriage, and saw frame, which is secured in place, when in use, in the same manner as the frame A.

D is the driving shaft, supported by, and running in suitable boxes; having a pulley on its outer end by which it is revolved, and the wheel E on its inner end to serve both as a crank to drive, and a fly wheel to steady the motion of the saw. In the face of the wheel E, in a slotted aperture is placed the pin E′ from which the saw is moved, and which may be moved nearer to or farther from the center of the wheel to decrease or increase the length of the stroke of the saw in proportion to the size of the timber to be cut up. The wheel E is counterbalanced on the side opposite to the one where the crank pin is inserted for the purpose of balancing the weight of the crank connecting rod, and to equalize the motion of the machine.

F is a guide rod, made of a square bar of iron, and run upon its corners in suitable boxes, to one end of which is attached by a suitable joint the crank connecting rod G, and to the other, by a similar joint, the saw handle H. By using a square bar of iron in this manner for the rod, the rod is not liable to be "bound" in its boxes, nor to have its movements impeded as it would be by the friction induced with an ordinary cross-head and slides, by a slight difference in the level of the saw frame and crank frame likely to occur when the machine is used in the woods. I is a cross-cut saw of ordinary construction, secured by bolts through its ends to the handles H and J—the handles being run in slotted apertures in the standards K K′ to guide and direct the saw both in its longitudinal and vertical movements.

L is the log-carriage consisting of an axle, (upon which the rear end of the log rests and upon which two flanged wheels are mounted) and the tongue M which runs through an aperture in the cross piece N to keep the axle and wheels in proper line. The carriage wheels run upon, and are guided by the ways O, O′, made of a length to suit the length of the logs to be sawed.

P is a guide roller; having a hollow or indentation made in the center of its length which receives and holds the front end of the log. Suitable dogs or catches are attached to the axle of the carriage, which are driven into the sides of the log to hold it from turning over while the saw is operating upon it. The log is moved forward, beneath the saw, the distance of the length of the "cut" to be made in it, by the rope or chain Q, wound around the cylinder R, and operated by the crank S.

The operation of the machine is so clearly shown in the drawings, that a lengthened description of it is deemed unnecessary. A suitable place being cleared in the woods in the vicinity of the logs to be sawed for the location of the machine and the horse power by which it is to be operated, and the machine being secured to the ground as described, a log is placed upon the carriage as shown in Fig. 3, and the saw operated until the cut is made. The log is then moved forward beneath the saw a distance equal to the length of the "cut" to be made by turning the crank S, and the operation thus repeated until the log is sawed up, when another log is placed upon the carriage and sawed up as described. The cutting capacity of the saw may be increased if required by placing weights upon the handle J.

What I claim as my improvement and invention and desire to secure by Letters Patent is—

The combination of the frame A, wheel E, and guide rod F, with the frame C and carriage L and saw I when arranged in relation to each other and operated in the manner, and for the purposes set forth.

JOHN T. ARMSTRONG.

Witnesses:
 THOS. BROWN,
 W. F. DAVISSON.